Feb. 20, 1951  C. E. CLEETON  2,541,986
DOUBLE PULSE GENERATOR
Original Filed March 15, 1945  3 Sheets-Sheet 1
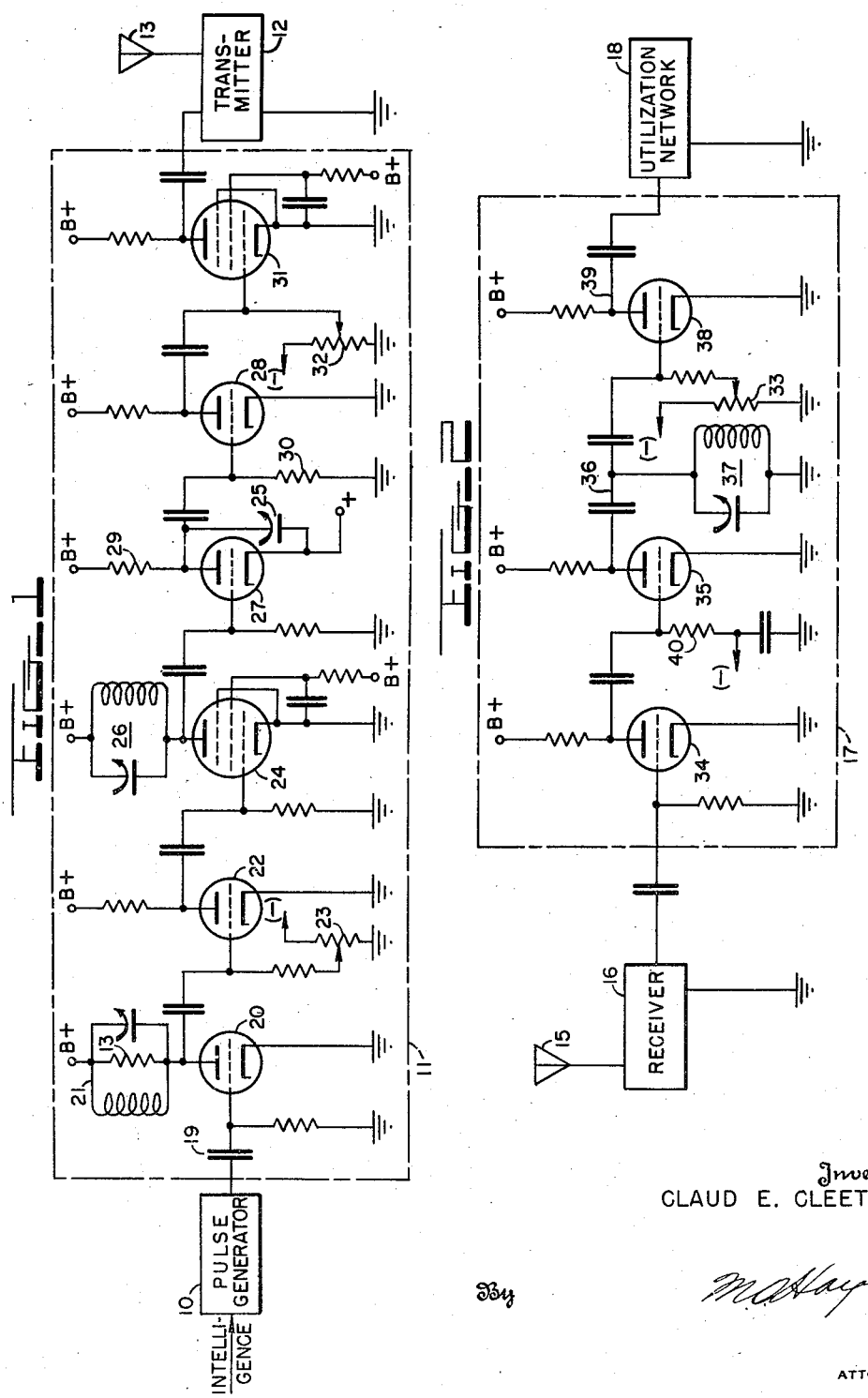
Inventor
CLAUD E. CLEETON
By M. A. Hayes
ATTORNEY

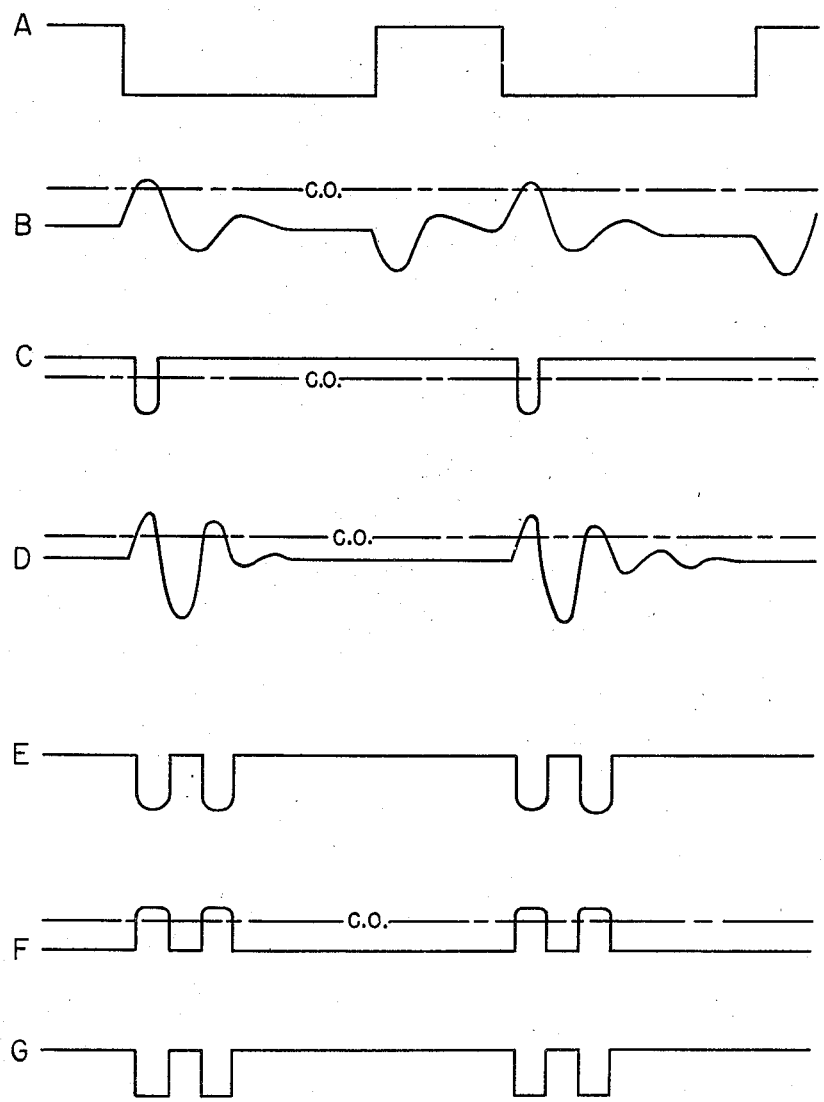

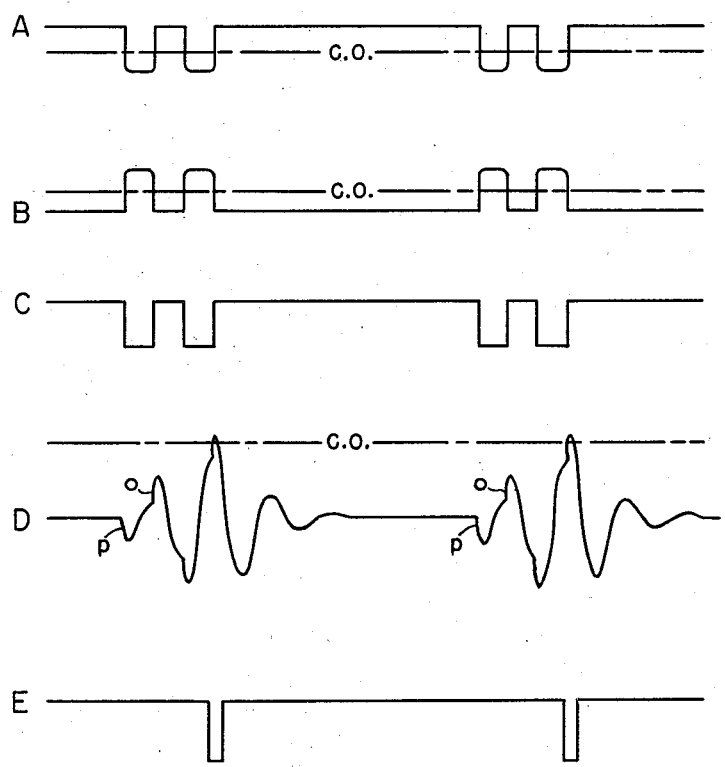

Patented Feb. 20, 1951

2,541,986

UNITED STATES PATENT OFFICE 2,541,986

DOUBLE PULSE GENERATOR

Claud E. Cleeton, Washington, D. C.

Original application March 15, 1945, Serial No. 582,966. Divided and this application September 26, 1947, Serial No. 776,394

4 Claims. (Cl. 250—6)

(Granted under the act of March 3, 1883, as amended April 30, 1928; 370 O. G. 757)

This invention relates to a method of transmission of radio frequency energy by means of a carrier envelope having definite characteristics, and is a division of application S. N. 582,966, filed March 15, 1945.

An object of this invention is to provide a system by which intelligence transmitted in the form of pulses of radio frequency energy may be received with a minimum of interference from man made or natural sources.

It is another object of this invention to provide a means for generating a signal of a definite shape or wave form for use in controlling the operation of a radio pulse type transmitter.

Another object of this invention is to provide a means for converting the single pulse signals of a repetitive, non-repetitive or other type of pulse transmission system into a group of pulses wherein all the pulses in the group are of equal time duration and spacing.

Other objects and features of the present invention will become apparent upon a careful consideration of the following detailed description when taken together with the accompanying drawings.

Figure 1 is a schematic diagram, partly in block, showing one application of the present invention:

Figure 2 is a schematic diagram, partly in block, showing the component parts of a receiving system which is to be used in this invention: and Figures 3 and 4 show a series of wave forms which are present at various points in the circuits of Figures 1 and 2 respectively and which are taken to illustrate the operation of these circuits.

Specifically it is the purpose of the present invention to provide a means for transforming each pulse signal of an otherwise conventional pulse transmission system into a pair of pulse signals having equal time duration and spacing. The use of such a means permits the employment of a receiving system which is held singly responsive to the pulse transmission characteristics of the invention and unresponsive to other types of pulse signals, and therefore a receiving system which is less susceptible to interference caused by either man-made or natural sources.

For purposes of illustration, the invention is shown in Figure 1 as incorporated in the transmitting equipment of an ordinary pulse transmission system. The pulse generator 10, pulse transmitter 12 and antenna 13 comprise the conventional components of the transmitting equipment while the apparatus indicated in general at 11 comprises a preferred embodiment of the invention. The pulse generator 10 represents any suitable device, such as a free running multivibrator, which is designed to convey the intelligence of the transmission either by way of, for example, the number of pulses it produces over a given time interval or by way of the time occurrence of its pulses. The transmitter 12 is representative of any suitable pulse type made available by the prior art and is arranged to be keyed either directly from the output of the circuit 11 or indirectly through a modulator, if desired.

The circuit 11, as here shown, is one specifically designed to convert a single pulse output from the pulse generator 10 into a pair of equal time duration pulses, spaced in time by an amount equal to the time duration of either of the pulses. This circuit consists of a first switch tube 20, a first ringing circuit 21, a clipping tube 22, a second switch tube 24, a second ringing circuit 26, and three final limiting and shaping tubes 27, 28 and 31. The first ringing circuit 21 consists of a low "Q" anti-resonant circuit serially connected in the plate circuit of the switch tube 20. The latter is provided with a zero bias and is operated from the output of the pulse generator 10. Pulse generator 10 produces the negative voltage pulses shown in wave form A of Figure 3, which are of sufficient amplitude to drive tube 20 beyond cutoff. The plate current, which tube 20 normally draws, passes through the inductance of the ringing circuit 21 and thereby stores a certain amount of energy in this inductance. When a negative pulse is applied through condenser 19 to the control grid of the tube 20, the leading edge of this pulse tries to abruptly interrupt the normal plate current flow through the inductance of the ringing circuit 21. Due to the energy stored in the inductance, however, the current can not be stopped immediately so that the ringing circuit is thrown into oscillation as shown by the wave form B of Figure 3. This oscillation occurs at the resonant frequency of the ringing circuit and the first excursion thereof always starts at zero phase and rises positive to reach maximum amplitude on the first half cycle. At the trailing edge of the negative voltage pulse, tube 20 is returned to conduction and the ringing circuit is again set into oscillation. This time, however, the oscillations are of the opposite phase and are highly damped by the conduction current of the switch tube 20. A small resistance 13 (in the order of 5000 ohms) is connected across the ringing circuit 21 to increase the losses in the latter, and thereby to rapidly reduce the amplitude of all the oscillations occurring after the first half cycle. The first positive half cycle of the oscillations may be made the highest amplitude of all the positive cycles only if the blocking pulse applied to the control grid of tube 20 be of some time duration other than a quarter of the natural period of the ringing circuit. Thus for optimum results, the time duration of the input pulse is usually kept large compared to the natural period of the first ringing circuit 21.

The oscillatory output of the ringing circuit 21 is obtained from the plate of tube 20 and is applied to the control grid of the clipping amplifier 22. The latter is so called because of the high negative bias applied to its control grid by way of the potentiometer 23. This potentiometer is adjusted so that only the crest of the first positive half cycle of oscillations will exceed the cut-off bias, which is indicated by the dotted line CO in wave form B of Figure 3. Since the edges of the oscillations are not abrupt, but are more nearly sine waves, the cut-off line CO may be moved vertically by adjustment of potentiometer 23 until the time duration of the negative blocking pulse produced at the plate of tube 22 is, as shown by the wave form C of Figure 3, equal to about one-quarter of the natural period of the second ringing circuit 26. The latter comprises a high "Q" anti-resonant circuit serially connected into the plate circuit of the second switching tube 24. This switch tube like switch tube 20 is operated at zero bias, so that its normal plate current acts to store a certain finite amount of energy in the inductance of the ringing circuit 26. Then when the negative blocking pulse output from the clipper amplifier 22, which is of sufficient amplitude to drive switch tube 24 below cut-off, is applied to the control grid of the latter, its leading abruptly interrupts the current flow through the inductance of the second ringing circuit to thereby throw circuit 26 into oscillation as shown by the wave form D of Figure 3 and in the same manner as the oscillations were started in the first ringing circuit 21. These oscillations, like those produced in the first ringing circuit, start at zero phase and rise positively at the resonant frequency of the circuit, which may be, for example 50 kc. Then, at a point in the oscillation where the rate of change of current is the greatest, which corresponds to the first quarter cycle point, the trailing edge of the negative pulse obtained from the plate of tube 22 restores conduction to tube 24. At this instant a second train of oscillations is produced in the ringing circuit 26. This train is of such a phase as to reinforce the initial oscillations and thus cause the amplitude of the second positive half cycle of oscillations to approach that of the first. The oscillations occurring after the second positive half cycle are rapidly damped by the conduction current drawn by the switch tube 24.

The oscillatory output of the second ringing circuit 26 is applied to the control grid of a first clipping and shaping amplifier 27 which contains a positive bias applied to its cathode, which is adjusted to permit only those positive inputs over a certain amplitude, indicated by the dotted cut-off line CO in wave form D to be amplified. As shown in wave form D, only the crests of the first two positive half-cycles of oscillation will exceed this cut-off bias. There is thus produced at the plate of tube 27 a pair of negative pulses which will have equal time durations only if that portion of the first two positive half cycles of oscillations clipped by tube 27 have equal base times. Therefore to equalize the time duration and spacing of the pulses produced at the plate of tube 27 so that they resemble that shown by the wave form D, a condenser 25 is connected in shunt with tube 27 and in combination with the plate resistance 29 forms a charging circuit. Adjustments in the size of condenser 25 determines the slope of the trailing edges of the pulses appearing at the plate of tube 27 and therefore their base width and spacing.

The negative double pulse output obtained from the plate of tube 27 is applied to the control grid of a second shaping and limiting amplifier 28. This amplifier is operated at zero bias and consequently will amplify only that portion of the double negative pulse input that does not exceed the cut-off bias. There is thus produced at the plate of tube 28 and applied to the control grid of the final shaping amplifier 31 the double positive pulse of wave form F. This final amplifier 31 contains a strong negative grid bias set by potentiometer 32 and will consequently amplify only the positive input above the cut-off line CO shown in wave form F. After amplification and inversion by this tube the output pulses appear as shown by the wave form G. These pulses are now of suitable amplitude and polarity to cathode key for instance, the transmitter 12, thus causing a double burst of radio frequency energy to be radiated from antenna 13.

A receiver system which is held solely responsive to pulse signals having transmission characteristics of the foregoing type is shown in Figure 2. This system comprises an antenna 15, a suitable pulse type receiver 16, a discriminator indicated in general at 17 and a utilization network 18. The latter may be an electrical counter circuit, a cathode ray tube for visually monitoring the received pulses or any other suitable device which may utilize the transmitted signals.

The discriminator 17 is a special circuit designed so as to reconvert a pair of pulse signals having the proper time duration and spacing into a single pulse output and is the subject of my application entitled "Pulse Discriminator Circuit" S. N. 582,097, filed March 10, 1945. This circuit comprises a limiter tube 34, a switch tube 35, a ringing circuit 37 and a final limiting tube 38. In operation, the detected output of the receiver 16, shown by the wave form A of Figure 4 is in the form of a pair of negative pulses which are applied to the control grid of the limiting amplifier 34. This amplifier, as shown, is operated at zero bias so as to cut-off the bottoms of the negative input pulses and apply to the control grid of the switch tube 35, a pair of uniform positive voltage pulses as shown by the wave form B of Figure 4. Switch tube 35 is operated with a negative grid bias, applied through resistance 40, so that it will amplify only those positive inputs that exceed the dotted cut-off line CO shown in the wave form B. After amplification and inversion, the output of the switch tube 35 appears in the form of a pair of negative rectangular voltage pulses. These pulses are as shown in wave form C in Figure 4 and are applied to the ringing circuit 37 through the condenser 36. The latter ringing circuit is an anti-resonant circuit which is tuned to the resonant frequency of the second ringing circuit 26 of the transmitter. At the leading edge of the first pulse output from the switch tube 35 the voltage across the ringing circuit 37 is driven negative somewhat as shown at P in wave form D of Figure 4 to thereby shock the ringing circuit 37 into oscillation at its natural frequency. A half cycle later when the shocked oscillations of the ringing circuit have reached the first positive crest of oscillation the positive going trailing edge of the first pulse drives the oscillation of the ringing circuit still further positive as shown at O in wave form D. Thereafter the leading and trailing edges of the second pulse abruptly increase respectively the amplitude of the next succeeding negative and positive crests of oscillations as shown, and in such a manner that the shocked oscillations of the ringing circuit gradually build up to maximum amplitude and thereafter die away at a rate governed by the "Q" of the circuit. These oscillations are then applied to the control grid of the clipper amplifier 38. This amplifier contains a strong negative grid bias applied through potentiometer 33 so that it will only amplify the positive inputs that exceed its cut-off bias shown by the dotted line CO in wave form D. Thus by a regulation of potentiometer 33 the cut-off bias of tube 38 can be set so that not until after the ringing circuit 37 has received four successive "kicks" in the proper time order will the oscillations build up sufficiently to overcome the cut-off bias of tube 38. When the oscillations build up sufficiently to overcome the cut-off bias of tube 38 there will be produced at point 39 the wave form E. Pulses of either greater or less time duration or of different spacing will not cause the oscillations to build up to the desired amplitude.

Since tubes 34 and 38 are operated as limiters the amplitude of the output signal at 39 will be substantially independent of the amplitude of the input signal and the output signal will be substantially free from interference even where the general noise level is much higher than the signal level. This invention also lends itself to selective transmission simply by making use of a pulse group transmission having a greater number of pulses or pulses having different time duration and spacing.

For example, a three pulse system could be obtained simply by adjusting potentiometer 33 at the receiver so that the cut-off bias of the final limiting tube 38 is such that the ringing circuit 37 requires six successive voltage kicks in the proper time order before the amplitude of its oscillation will build up sufficiently to exceed the cut-off bias of tube 38. In this case, the first ringing circuit 21 at the transmitter should be tuned to a frequency slightly below that of the second ringing circuit 26 and the bias of the first clipping tube 22 should be set by potentiometer 23 so that the time duration of the output pulse from the tube 22 will be such that the trailing edge of this pulse will restore conduction to the second switch tube 24 at the crest of the second positive half cycle of oscillation instead of at the crest of the first half cycle.

Although I have shown and described only a certain and specific embodiment of the invention it must be understood that I am fully aware of the many modifications possible thereof.

The invention described herein may be manufactured and used by or for the Government of the United States of America for government purposes without payment of any royalty thereon or therefor.

What is claimed is:

1. In a communication system of the type in which signal characteristics are represented by a series of first impulses modulated to represent the intelligence to be transmitted, said first impulses being spaced apart in time a large amount with respect to their duration, an arrangement for reducing the disturbing effects of interfering impulses comprising means for producing from each of said first impulses at least two indicating impulses spaced apart in time by a fixed time interval which is small with respect to the spacing of said first impulses, receiver means for receiving said indicating impulses, and discriminator means in said receiver means for discriminating between impulses spaced apart by said fixed time interval and all other impulses, whereby only said spaced impulses may be used for signal indications.

2. A communication system according to claim 1 further comprising translator means for deriving the modulating signal from said received indicating impulses.

3. A receiver system for receiving pairs of impulses spaced apart a predetermined amount in time, each pair representing an increment of modulating signal energy in a modulated wave, means for receiving said pairs of impulses, discriminating means in said receiver for discriminating between pairs of impulses separated by said predetermined time delay and all other impulses, and translator means coupled to said discriminating means for reproducing the original modulating signal of said modulated wave.

4. A pulse transmission system comprising a first pulse generator means for generating a first series of impulses modulated to represent the intelligence to be transmitted, said first series of impulses being spaced apart in time a large amount with respect to their duration, and a second pulse generator coupled to said first pulse generator means for producing from each impulse of said first series of impulses at least two indicating impulses spaced apart in time by a fixed time interval which is independent of the duration of the first impulses and small with respect to the spacing of the first impulses.

CLAUD E. CLEETON.

REFERENCES CITED

The following references are of record in the file of this patent:

UNITED STATES PATENTS

| Number | Name | Date |
| --- | --- | --- |
| 2,145,332 | Bedford | Jan. 31, 1939 |
| 2,207,775 | Bedford | July 16, 1940 |
| 2,223,812 | Bedford | Dec. 3, 1940 |
| 2,266,401 | Reeves | Dec. 16, 1941 |
| 2,416,286 | Busignies | Feb. 25, 1947 |
| 2,416,304 | Grieg | Feb. 25, 1947 |
| 2,433,407 | Tahon | Dec. 30, 1947 |
| 2,462,061 | Beatty | Feb. 22, 1949 |
| 2,464,667 | Boosman et al. | Mar. 15, 1949 |